US011873970B2

(12) United States Patent
Jones et al.

(10) Patent No.: US 11,873,970 B2
(45) Date of Patent: Jan. 16, 2024

(54) SHALLOW ADJUSTABLE RECESSED LIGHT FIXTURE

(71) Applicant: USAI, LLC, New Windsor, NY (US)

(72) Inventors: Jonathan I. Jones, Highland, NY (US); John P. Harkins-Fleischmann, Bloomingdale, NJ (US)

(73) Assignee: USAI, LLC, New Windsor, NY (US)

( * ) Notice: Subject to any disclaimer, the term of this patent is extended or adjusted under 35 U.S.C. 154(b) by 0 days.

(21) Appl. No.: 18/183,316

(22) Filed: Mar. 14, 2023

(65) Prior Publication Data

US 2023/0288036 A1 Sep. 14, 2023

Related U.S. Application Data

(60) Provisional application No. 63/319,706, filed on Mar. 14, 2022.

(51) Int. Cl.

| | |
|---|---|
| ***F21S 8/02*** | (2006.01) |
| ***F21V 21/04*** | (2006.01) |
| ***F21V 29/70*** | (2015.01) |
| ***F21V 23/00*** | (2015.01) |
| ***F21V 15/01*** | (2006.01) |

(52) U.S. Cl.

CPC .............. *F21S 8/026* (2013.01); *F21V 15/01* (2013.01); *F21V 21/04* (2013.01); *F21V 23/007* (2013.01); *F21V 29/70* (2015.01)

(58) Field of Classification Search

CPC .......... F21S 8/026; F21V 15/01; F21V 21/04; F21V 23/007; F21V 29/70

See application file for complete search history.

(56) References Cited

U.S. PATENT DOCUMENTS

| | | | | |
|---|---|---|---|---|
| 9,234,647 | B2 * | 1/2016 | Gabrius | F21V 7/0025 |
| 9,851,081 | B2 * | 12/2017 | Clark | F21V 21/28 |
| 10,066,817 | B2 * | 9/2018 | Silver | F21S 8/026 |
| 10,359,162 | B2 * | 7/2019 | Terumichi | F21V 7/08 |
| 10,502,395 | B2 * | 12/2019 | Tan | F21V 19/02 |
| 10,557,622 | B2 * | 2/2020 | Highbridge | F21V 23/003 |
| 10,663,153 | B2 * | 5/2020 | Nikooyan | F21S 8/026 |
| 11,629,853 | B1 * | 4/2023 | Wong | F21V 29/73 362/373 |
| 2015/0219317 | A1 * | 8/2015 | Littman Gatof | F21V 21/40 362/372 |

(Continued)

*Primary Examiner* — Tsion Tumebo

(74) *Attorney, Agent, or Firm* — St. Onge Steward Johnston & Reens LLC

(57) ABSTRACT

A low-profile recessed light fixture has a housing with a low height and forming a light engine enclosure with an aperture. A light engine assembly within the light engine enclosure as a heat sink assembly and a light emitting element. The heat sink assembly has first and second heat sinks, and the light emitting element is mounted to the first heat. The first heat sink is operable to tilt relative to the second heat sink about a tilt a tilt range. The light engine assembly is operable to translate between an operation position and an offset service position. In the operation position at a zero tilt an optical axis of the light emitting element is substantially parallel to a vertical axis passes through a center of the aperture. The light engine assembly being operable to rotate relative to the housing through a rotation range of at least 360 degrees.

9 Claims, 21 Drawing Sheets

(56) References Cited

U.S. PATENT DOCUMENTS

| | | | | |
|---|---|---|---|---|
| 2015/0308662 | A1* | 10/2015 | Vice | F21V 21/30 362/419 |
| 2017/0059135 | A1* | 3/2017 | Jones | F21V 29/763 |
| 2019/0120449 | A1* | 4/2019 | Jones | F21V 21/041 |
| 2020/0348001 | A1* | 11/2020 | Spicer | F21V 21/04 |

* cited by examiner

SECTION VIEW

SHALLOW ADJUSTABLE RECESSED LIGHT FIXTURE

FIELD OF THE INVENTION

The invention pertains to lighting, and in particular recessed lighting fixtures.

BACKGROUND OF THE INVENTION

Recessed lighting fixtures have been a popular lighting solution for many years, providing general illumination for a room without attracting attention to themselves. However, with the rise of interior design as a prominent aspect of home and office improvement, the desire for aesthetically pleasing and functional recessed lighting fixtures has increased.

One particular challenge that has arisen with the installation of recessed lighting fixtures is the limited space available in ceilings and plenums. Many desired installation locations for recessed lighting have limited space between the ceiling material and the roof or floor above, which can make the installation of traditional recessed lighting fixtures difficult or even impossible. In response to this challenge, there has been a growing demand for low-profile recessed lighting fixtures that can be installed in limited spaces.

In addition to the need for low-profile fixtures, the ability to adjust between a downlight configuration and a wall wash configuration has become highly desirable, as it allows for a variety of lighting effects to be achieved with a single fixture. This adjustability feature can enhance the functionality of the fixture and provide greater flexibility in achieving the desired lighting effects.

Furthermore, serviceability has become an important aspect of recessed lighting fixture design. Traditional fixtures require professional assistance to replace or repair electrical components, which can be time-consuming and costly. The ability to service the fixture from within the room can greatly simplify maintenance and save time and money.

Therefore, what is desired is a low-profile recessed lighting fixture that allows for greater flexibility in installation, making it possible to add recessed lighting to spaces that were previously inaccessible, in addition to adjustability between a downlight configuration and a wall wash configuration that allows for a range of lighting effects to be achieved with a single fixture, reducing the need for multiple fixtures to achieve different lighting effects. This can simplify installation and reduce costs. Furthermore, what is desired is the ability to service the fixture from within the room to greatly simplify maintenance, reducing the need for professional assistance and saving time and money.

SUMMARY OF THE INVENTION

The shallow adjustable recessed light fixture is a low-profile recessed light fixture adapted to be installed in a horizontal ceiling and configured to emit light through an opening in the ceiling into a room there below.

The light fixture has a housing having a horizontal longitudinal axis (X-axis) and a horizontal lateral axis (Y-axis) perpendicular to the longitudinal axis (X-axis), and having a vertical axis (Z-axis), and has a low-profile height dimension parallel to the vertical axis (Z-axis).

The housing forms a light engine enclosure having an aperture and forms a driver enclosure spaced from the aperture parallel to the longitudinal axis (X-axis). A lighting driver configured to be disposed within the driver enclosure;

The light fixture has a light engine assembly disposed within the light engine enclosure, which has a heat sink assembly and a light emitting element, such as and LED, having an optical axis.

The heat sink assembly has first heat sink and a second heat sink movably mounted to the first heat sink. The light emitting element is mounted to the first heat sink and the first heat sink.

The first heat sink is operable to tilt relative to the second heat sink about a tilt axis parallel to the lateral axis (Y-axis) through a tilt range from a zero tilt position where the optical axis of the light emitting element is substantially parallel to the vertical axis (Z-axis), to a wall wash tilt position where the optical axis is aligned at a substantial angle relative the vertical axis (Z-axis).

The first heat sink maintains a substantially constant thermal connection with the second heat sink in any tilt position and during movement between tilt positions.

The light engine assembly is operable to move horizontally parallel to the longitudinal axis (X-axis) relative to the housing between an operation position where the light engine assembly is at a first distance from the driver enclosure, and a service position where the light engine assembly is at a second distance from the driver enclosure greater than the first distance.

The light engine assembly is movable between the operation position and the service position when the light engine assembly is in any tilt position in the tilt range.

When the light engine assembly is in the operation position and the first heat sink is in the zero tilt position, the optical axis of the light emitting element being substantially parallel to the vertical axis (Z-axis) and substantially passes through a center of the aperture. When the light engine assembly is in the service position and the first heat sink is in the zero tilt position, the optical axis of the light emitting element is substantially parallel to the vertical axis (Z-axis) and being substantially offset from the center of the aperture.

The light engine assembly is operable to rotate relative to the housing about a rotation axis parallel to the vertical axis (Z-axis) when in the operation position through a rotation range of at least 360 degrees including a zero rotation position.

The light engine assembly is fixedly mounted to a rotation disc which is mounted to a top wall of the housing by a pair of guides which are operable to substantially constrain the movement of the light engine assembly relative to the housing to translation movement between the operation and service positions, and rotation about the rotation axis.

The rotation disc includes a linear guide slot having a first end at a center of the rotation disc and a second end disposed radially outwardly from the center, and the rotation axis of the light engine assembly passes through the center of the rotation disc.

The top wall of the housing includes a projection which projects into the guide slot of the rotation disc, and the guide slot and projection cooperate to permit rotation of the light engine assembly relative to the housing when in the operation position and to prevent rotation of the light engine assembly relative to the housing when in the service position.

The guide slot and projection also cooperate to permit movement of the light engine assembly from the operation position to the service position when in the zero rotation position and to prevent movement of the light engine assembly from the operation position to the service position when in a rotation position substantially different than the zero rotation position.

In the operation position, the light engine assembly is operable to emit light through the aperture throughout the rotation range and tilt range.

The lighting driver is insertable into and removable from the driver enclosure, through the aperture, when the light engine assembly is in the service position.

Due to the combination of a low-profile design, adjustability, and easy serviceability, the invention is highly suitable for both residential and commercial lighting applications, particularly in spaces with limited installation options.

DETAILED DESCRIPTION OF THE INVENTION

Figure 2:
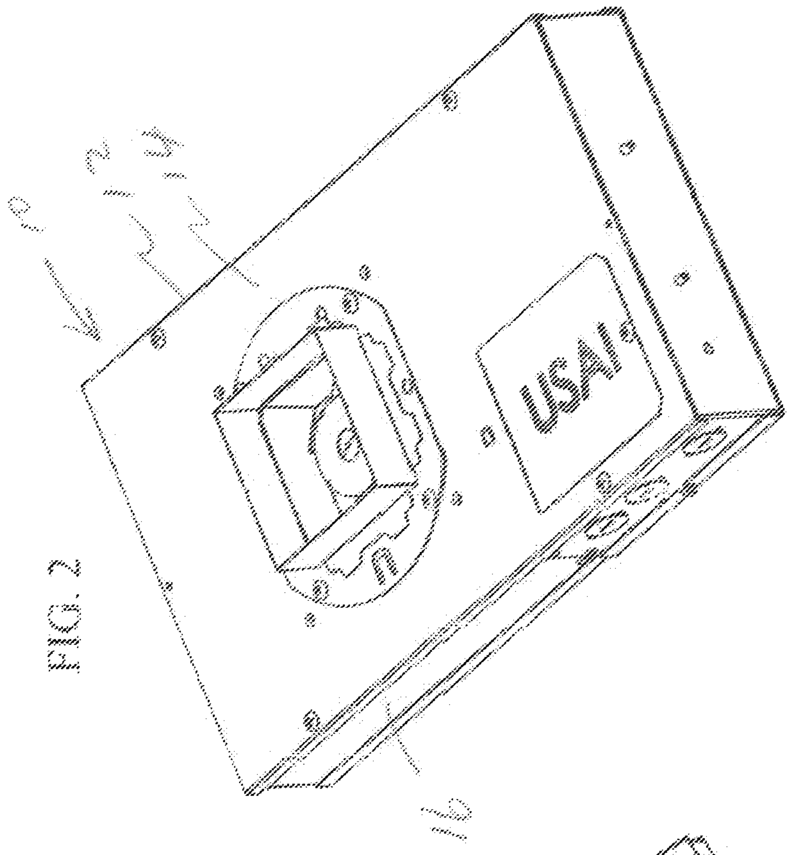
FIG. 2 is a perspective view, from the bottom, of the lighting fixture of FIG. 1.
Figure 1:
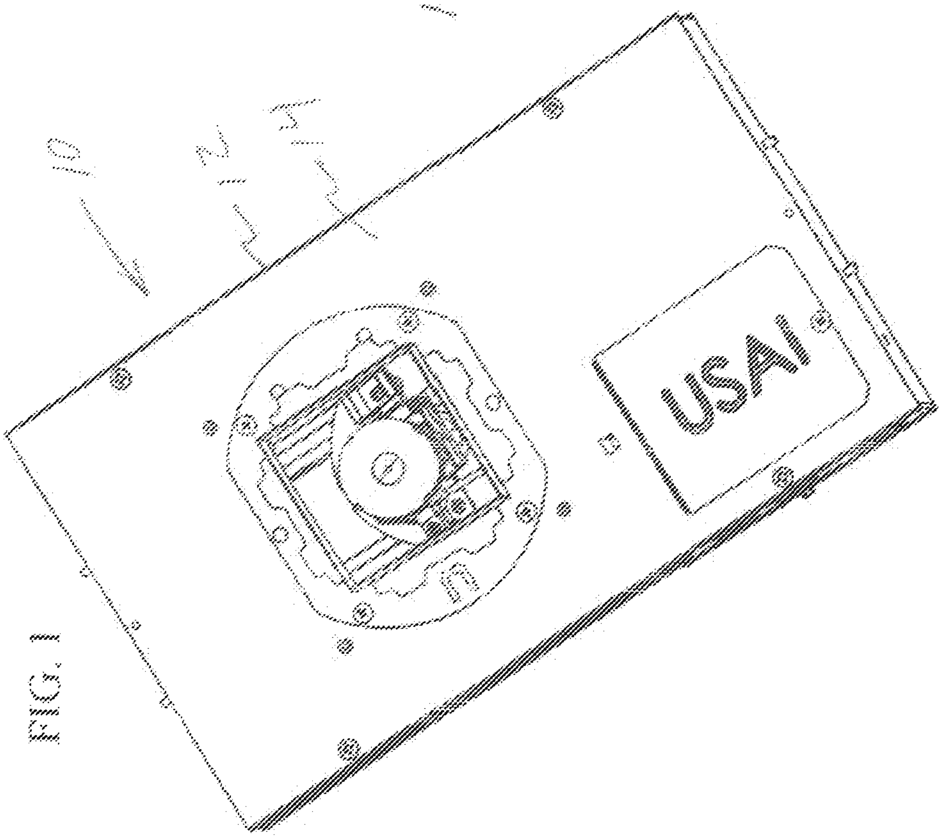
FIG. 1 is a perspective view, from the bottom, of an embodiment of a lighting fixture according to the invention, in an operation mode, in a first configuration.
Figures 3, 4:
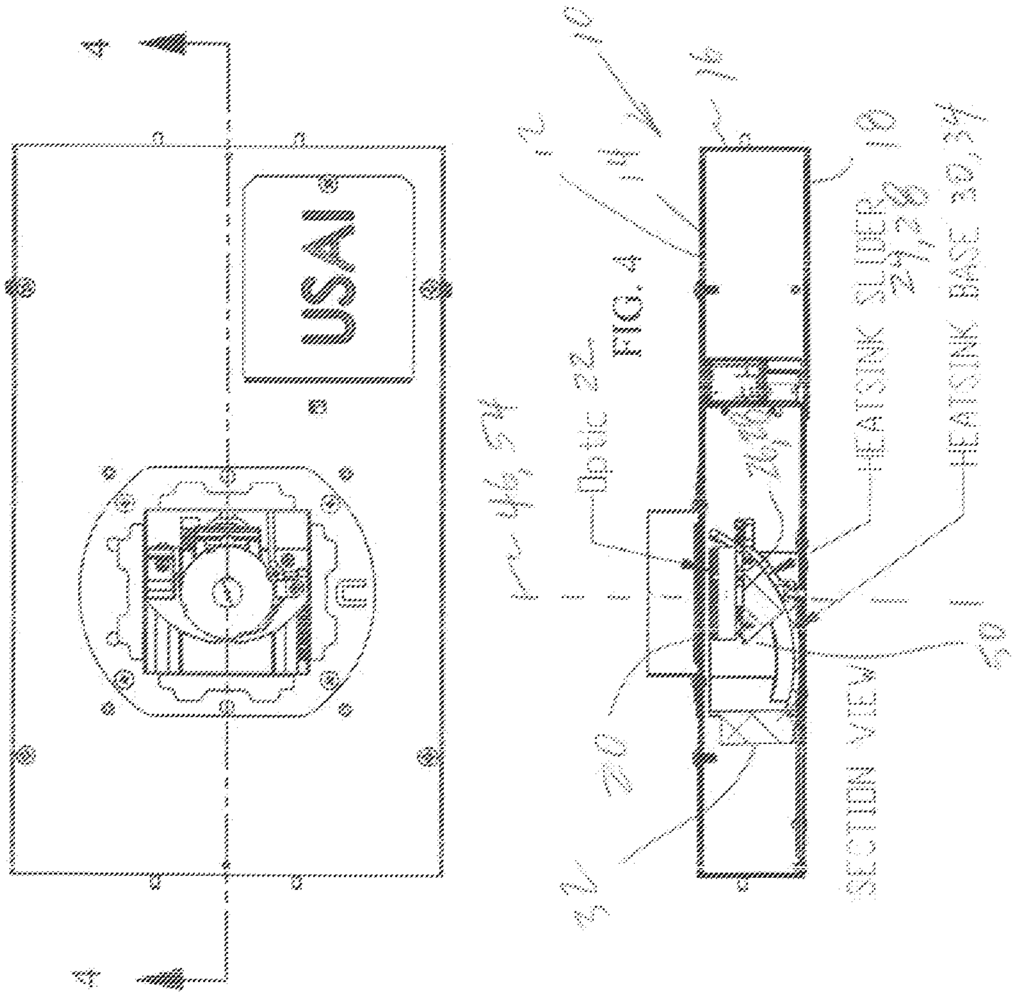
FIG. 3 is a bottom view of the lighting fixture of FIG. 1.
FIG. 4 is cross section view taken along line 4-4 of FIG. 3.
Figure 6:
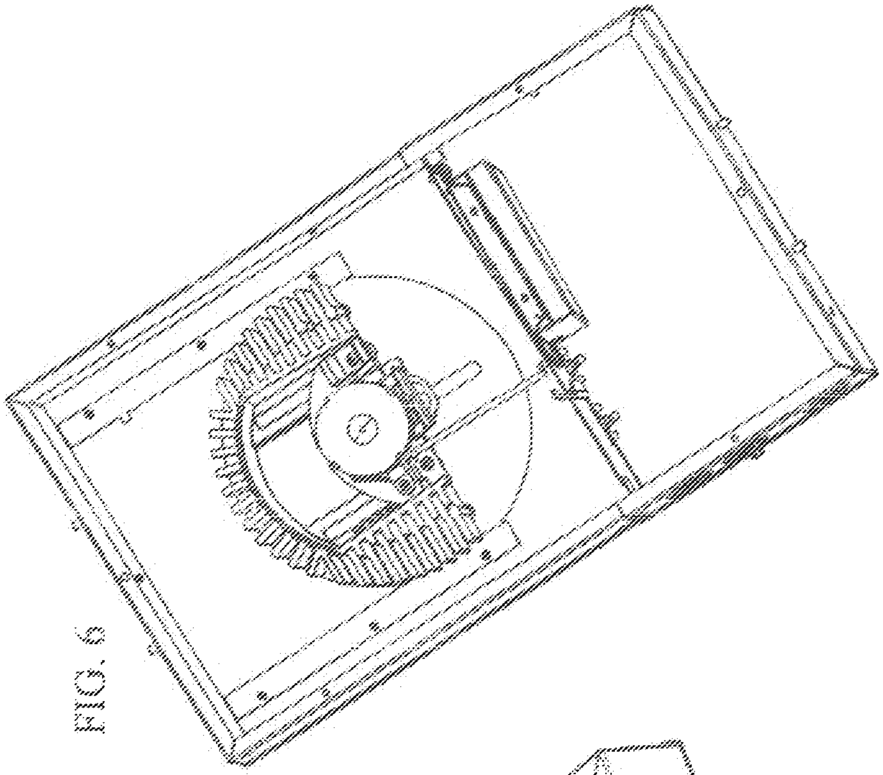
FIGS. 5 and 6 are perspective views, from the bottom, of the lighting fixture of FIG. 1, with the bottom wall removed.
Figure 5:
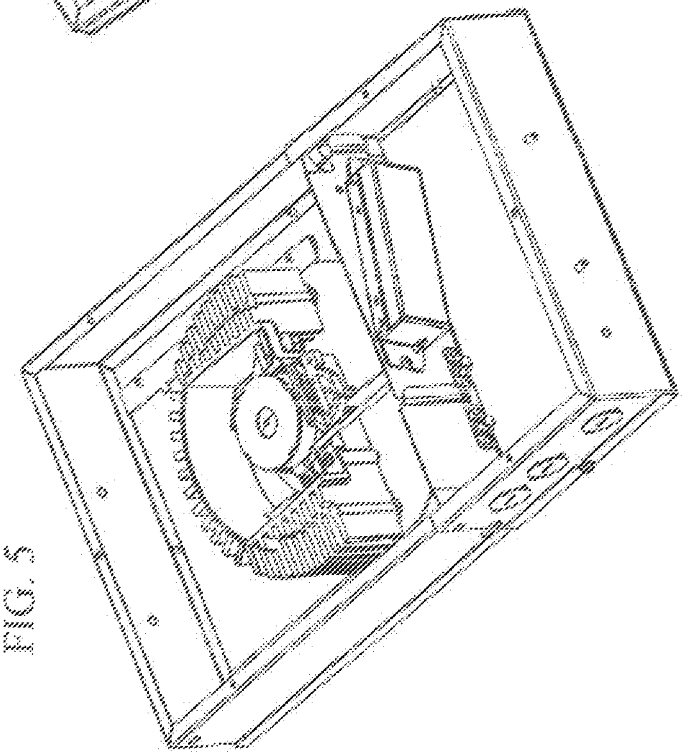
Figure 7:
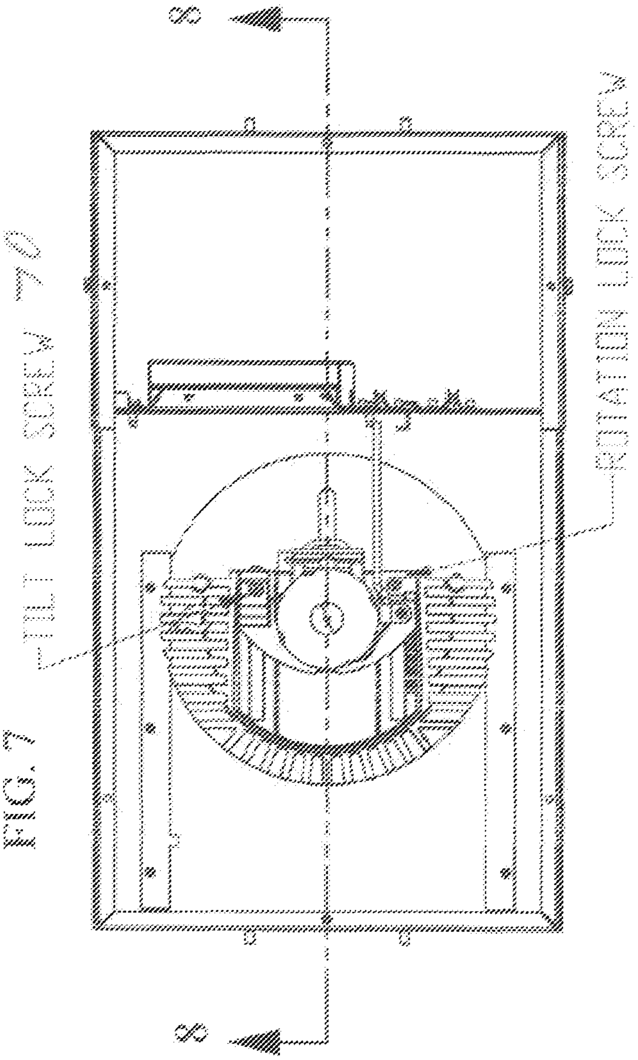
FIG. 7 is a bottom view of the lighting fixture of FIG. 1, with the bottom removed.
Figure 8:
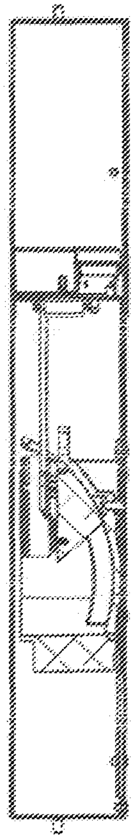
FIG. 8 is cross section view taken along line 8-8 of FIG. 7.
Figure 10:
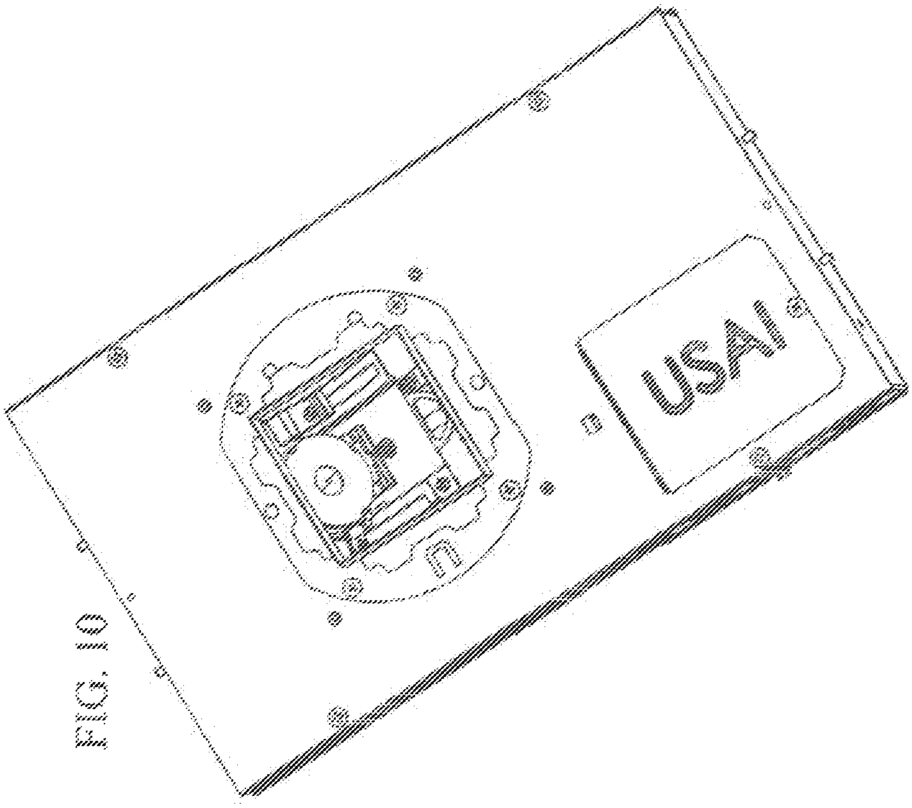
FIG. 10 is a perspective view, from the bottom, of the lighting fixture of FIG. 9.
Figure 9:
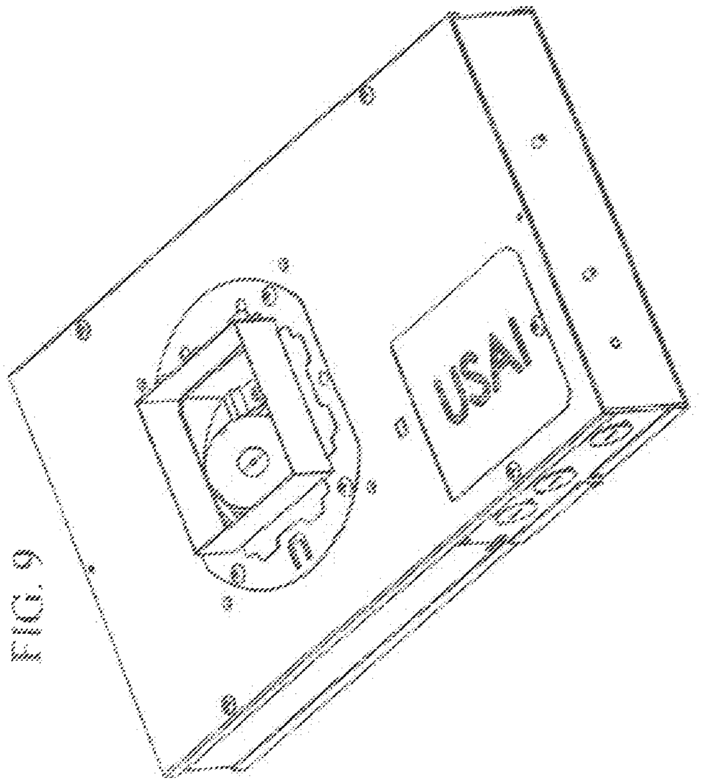
FIG. 9 is a perspective view, from the bottom, the lighting fixture of FIG. 1, in the operation mode, in a second configuration.
Figure 11:
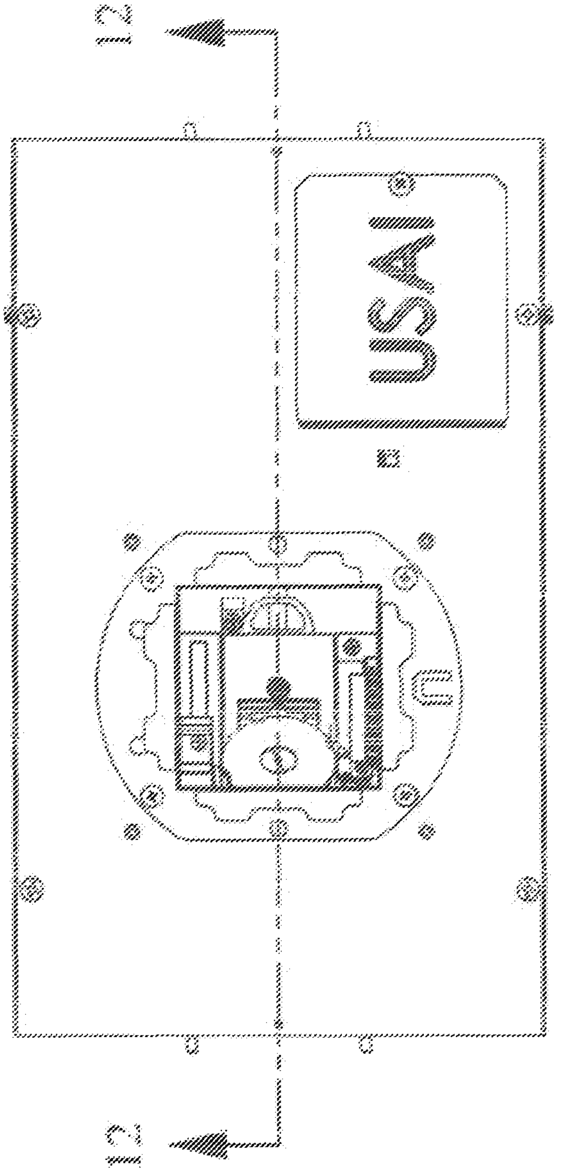
FIG. 11 is a bottom view of the lighting fixture of FIG. 9.
Figure 12:
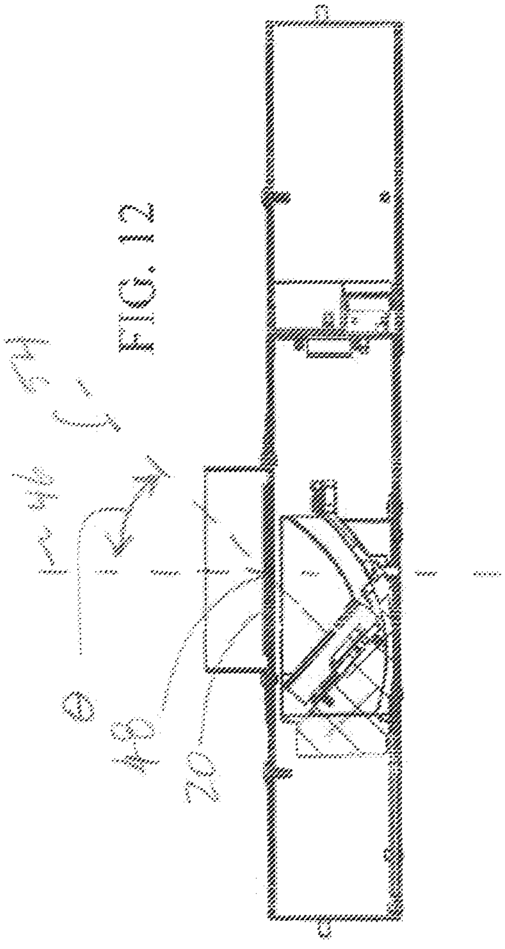
FIG. 12 is cross section view taken along line 12-12 of FIG. 11.
Figure 14:
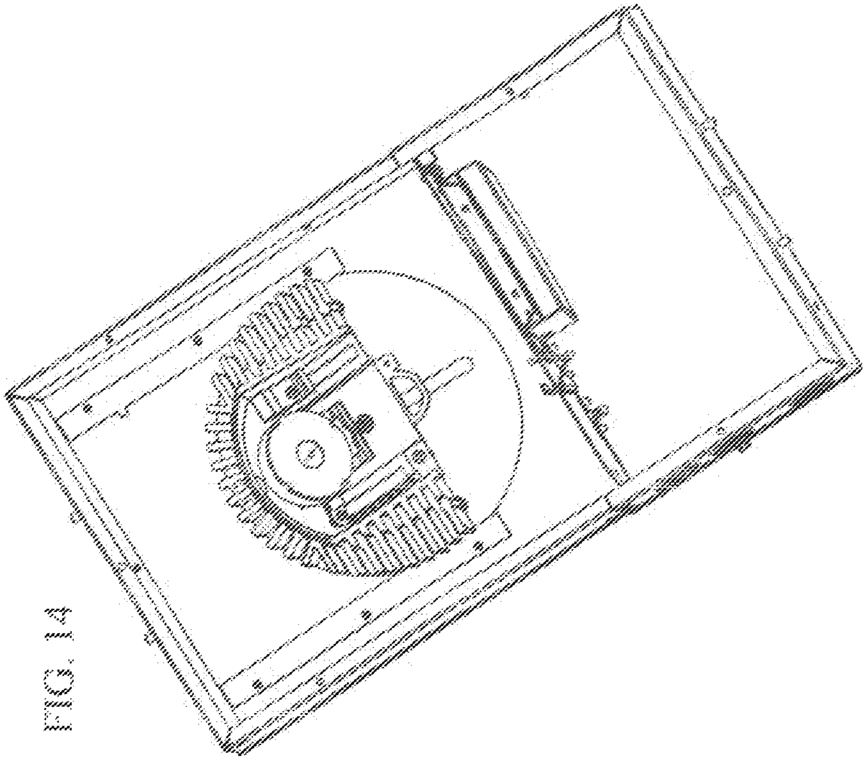
FIGS. 13 and 14 are perspective views, from the bottom, of the lighting fixture of FIG. 9, with the bottom wall removed.
Figure 13:
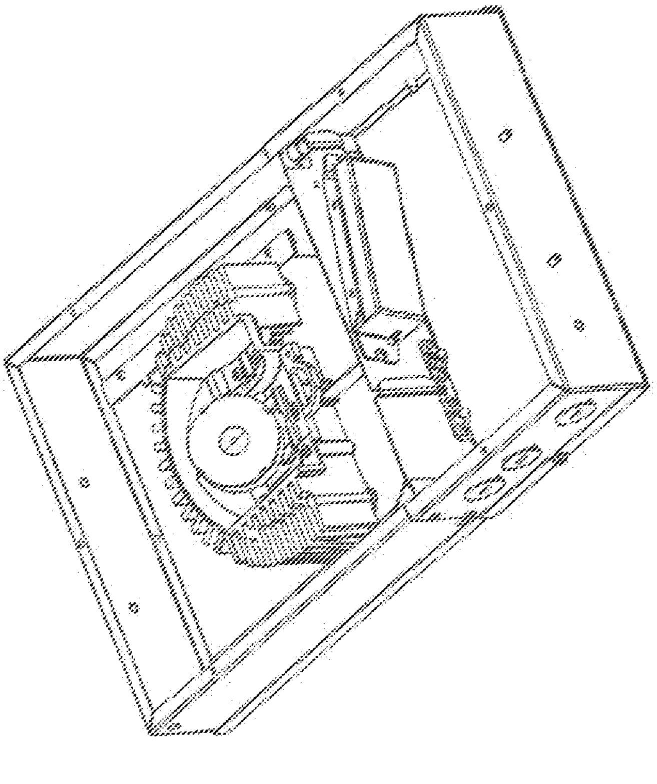
Figure 15:
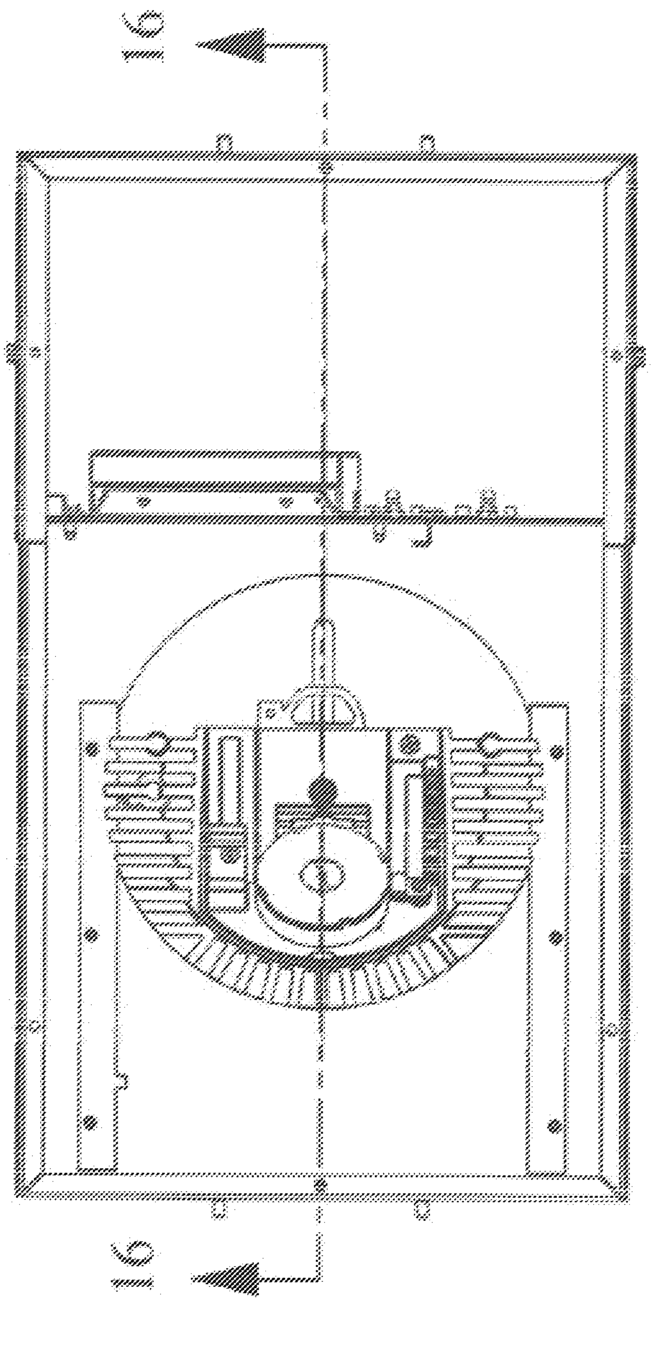
FIG. 15 is a bottom view of the lighting fixture of FIG. 9, with the bottom removed.
Figure 16:
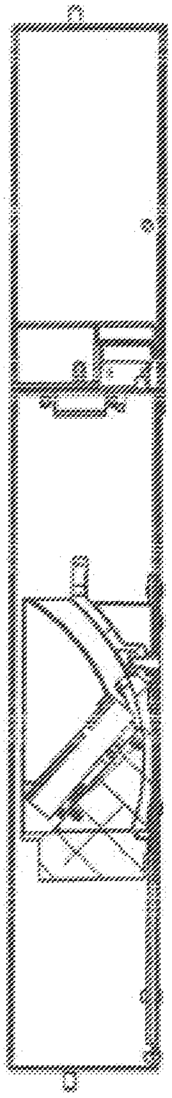
FIG. 16 is cross section view taken along line 16-16 of FIG. 15.

Referring to FIGS. 1-30, the lighting fixture 10 is configured as a recessed light fixture which is installed above a ceiling structure and projects light through an opening in the ceiling into a room below. The lighting fixture 10 is described herein as being installed and/or oriented with respect to a horizontal ceiling, which is typical. However, it should be understood that other orientations are possible.

The lighting fixture 10 has an operation mode (e.g., FIGS. 1-8) for normal operation, and has a service mode (e.g., FIGS. 17-18) for servicing the lighting fixture after installation. The lighting fixture provides for adjusting a tilt angle of light emitted such that it can be configured as a "down light," where a majority of the light is emitted substantially vertically downward, or in one or more "wall-wash" configurations, where the light is emitted at a substantial angle from vertical, and typically toward an adjacent wall or object to be illuminated. The lighting fixture also provides for adjusting a rotational orientation of the emitted light.

Referring to FIGS. 1-8 (which are views from below and a side), the lighting fixture 10 is shown in the operation mode and at a zero degree rotation and zero degree tilt angle. The lighting fixture 10 has a housing 12 forming a light source enclosure 58. The housing 12 can have a bottom wall 14, a plurality of side walls 16 and a top wall 18, all of which form an enclosure. As depicted, the housing 12 can form a substantially full enclosure, having for example six walls. However, the housing can also form a partial enclosure having for example less than six walls.

The bottom wall 14 of the housing 12 has an aperture 20 which in use is aligned with an opening in a ceiling, and light is emitted through the aperture into a room or space below the ceiling. Due to the configuration of the components of the lighting fixture 10, the housing 12 can be relatively "shallow," meaning that it can have a relatively low vertical height or profile, such as about 3-5 inches. The fixture can extend a minimum of about 2.25" into the plenum space (above the ceiling). Including the aperture and ceiling in the measurement, the overall height of can be about 3.35".

The lighting fixture 10 also has a light source 22, such as a Light-Emitting Diode(s) (LED), or another suitable light source, for emitting light through the aperture 20 of the lighting fixture 10. The lighting fixture 10 is adapted to permit tilting and rotation of the light source 22 relative to the housing 12 to allow aiming of the light beam emitted from the light fixture.

A center axis 46 (typically vertical) of the aperture 20 of the lighting fixture 10 passes through a center 48 of the aperture 20 (on the plane of the aperture), and is perpendicular to the plane of the aperture 20, which is typically a horizontal plane. The light source 22 has an optical axis 54 which, in a zero-degree tilt configuration, is aligned (i.e., co-linear) with the center axis 46 of the aperture 20.

The lighting fixture 10 has a heat dissipation system comprising several heat sinks, preferably comprised of thermally conductive material such as aluminum (or another suitable material having high thermal conductivity), which cooperate to dissipate heat generated by the light source, while allowing for adjustment of tilt and rotation positions of the light source.

The heat dissipation system can include a first heat sink 24 to which the light source 22 is fixedly connected (a heat sink slider), and the first heat sink 24 is operable to conduct heat away from the light source 22 during operation of the lighting fixture 10. The first heat sink 24 has a base 26 which is thermally coupled to the light source 22 (and/or a mount for the light source), and has a thermal interface 28, which is opposite the base 26. For example, in the case of a Light-Emitting Diode (LED) light source, where one or a plurality of LEDs are mounted to a substrate such as a printed circuit board (PCB) or the like, the base 26 of the first heat sink 24 can be connected to a side of the substrate opposite the LEDs and the thermal interface 28 is disposed on a side of the first heat sink 24 opposite the base 26 such that the first heat sink 24 is operable to conduct heat from the light source 22 to the thermal interface 28 through a body of the first heat sink.

The lighting fixture 10 includes a second heat sink 30 preferably having heat dissipating fins 32 disposed on an exterior surface thereof and having a thermal interface 34 on an interior thereof adapted to engage and thermally couple with the thermal interface 28 of the first heat sink 24. The first heat sink 24 and light source 22 are preferably mounted to and supported by the second heat sink 30 such that rotation and/or translation movement of the second heat sink 30 results in equivalent movement of the first heat sink 24 and light source 22. The first and second heat sinks 24, 30 and the light source form a light engine assembly 50 which is preferably movably mounted to the housing 12 such that the light engine assembly 50 can translate and rotate relative to the housing 12 and can be fixed in various positions and angles.

A tilt position of the light source 22 and first heat sink 24 can be selectively adjusted and fixed relative to the second heat sink 30 to allow tilt adjustment of the light source 22 and the optical axis 54 thereof, relative to the center axis 46 of the aperture 20.

The thermal interface 28 of the first heat sink 24 is in thermal contact with the thermal interface 34 of the second heat sink 30 (optionally with thermal tape or similar material therebetween) substantially throughout a contact area (preferably at least about 100 $cm^2$), to thermally couple the first and second thermal interfaces over the contact area, whereby the second heat sink 30 is operable to remove heat from the first heat sink 24 by thermal conduction through the contact area to dissipate the heat into an ambient environment through the fins 32.

The position of the first heat sink 24 and light source 22 is adjustable relative to the second heat sink 30 to a plurality of positions along an adjustment path (or preferably continuously to any position along the path). Preferably, the adjustment path follows a curve lying on a (typically vertical) plane perpendicular to the plane of the aperture 20 of the lighting fixture 10 and concave toward the plane of the aperture 20 such that, during movement of the first heat sink 24 and light source 22 along the adjustment path, the optical axis 54 of the light source 22 pivots (tilts) relative to the center axis 46 of the aperture.

Preferably, in a first, "zero tilt" position along the path (e.g., FIGS. 1-8), the optical axis 54 of the light source 22 is co-linear with the center axis 46 of the aperture 20. In this position, the lighting fixture may be used as a down-light wherein the light emitted from the light fixture is directed straight through (perpendicular to) the plane of the aperture 20 of the lighting fixture (e.g., at zero (0) degree tilt). Preferably, the first, "zero" tilt position is a limit position at one end of the adjustment path so that the lighting fixture can be easily and reliably placed in the zero (0) degree tilt position.

Referring to FIGS. 9-16 (which are views from below and a side), the lighting fixture 10 is shown in the operation mode, at a 40 degree tilt angle and zero degree rotation. The tilt adjustment allows the lighting fixture 10 to change to a wall-wash orientation wherein the light is emitted through the aperture 20 at an acute angle (0) relative to the aperture plane (e.g., up to forty (40) degrees tilt, or more). Preferably, in all (or some) non-zero tilt angles, the optical axis 54 is angularly displaced from, but intersects the center axis 46, at the center 48 of the aperture 20.

To accommodate the curved adjustment path, the thermal interfaces 20, 26 of the first and second heat sinks 16, 22 have complementary curved surfaces. Preferably, the thermal interface 20 of the first heat sink 16 is in the form of a partially cylindrical convex surface having a radius of curvature equal to that of the curved adjustment path, and the thermal interface 26 of the second heat sink 22 is in the form of a complementary, partially cylindrical concave surface. However, preferably, an arc length of the thermal interface 26 of the second heat sink 22 (as measured along the adjustment path) is substantially longer than an arc length of the thermal interface 20 of the first heat sink 16. For example, the arc length of the thermal interface 26 of the second heat sink 22 may be 2 to 10 times greater than that of the first thermal interface 20 to allow the first heat sink 16 to thermally couple with the second heat sink 22 in at least two non-overlapping positions along the adjustment path. A tilt lock 70 is operable to selectively secure the first heat sink 24 at a desired tilt angle.

In the operation mode (e.g., FIGS. 1-16), the light engine assembly 50 (e.g., including the lighting element 22 and heat sinks 24, 30) is in an operation position above or adjacent the aperture 20 and the lighting element 22 is operable to emit light through the aperture.

Figure 17:
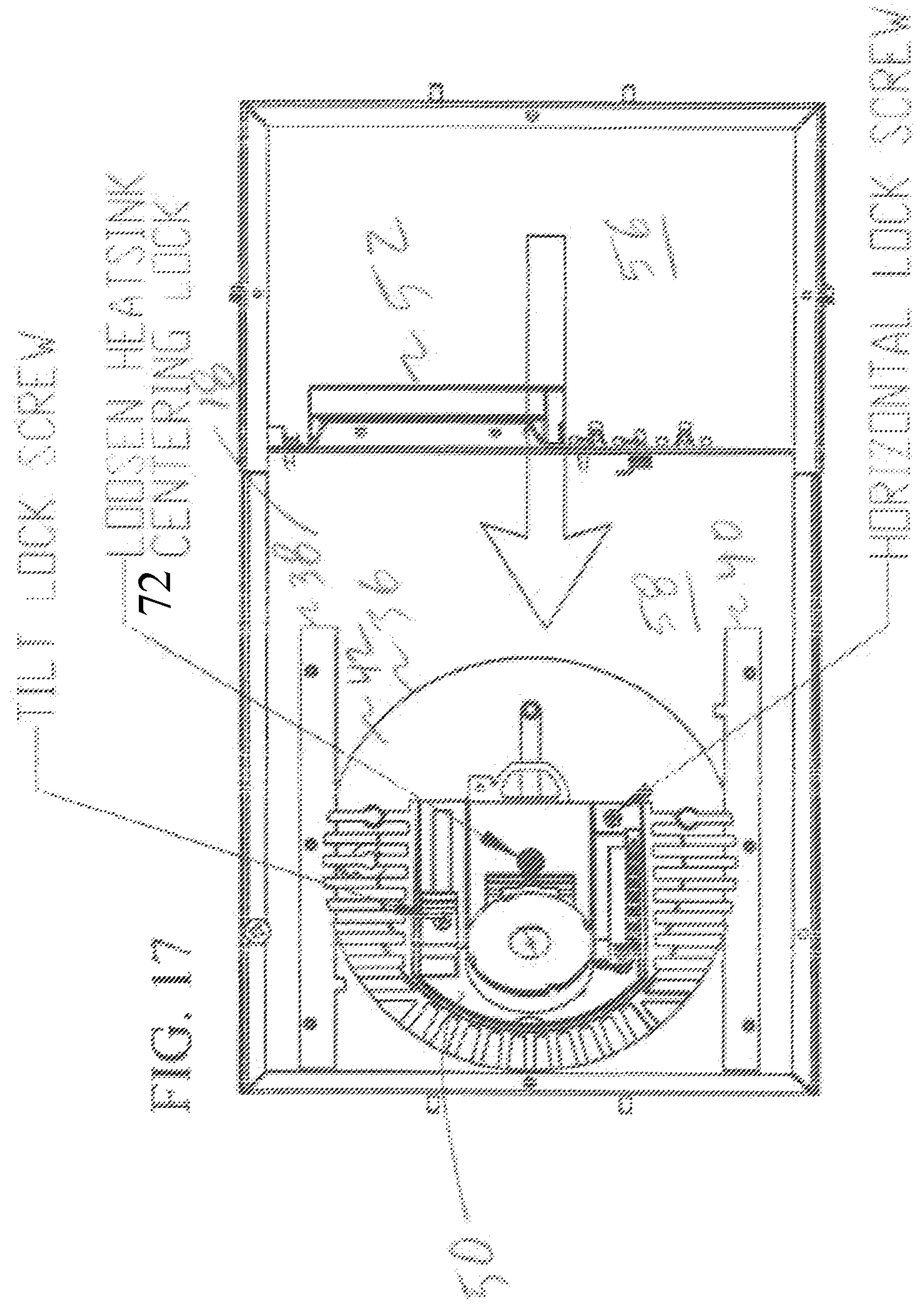
FIGS. 17 and 18 are bottom views of the light fixture of FIG. 9 in a service mode, with the bottom removed.
Figure 18:
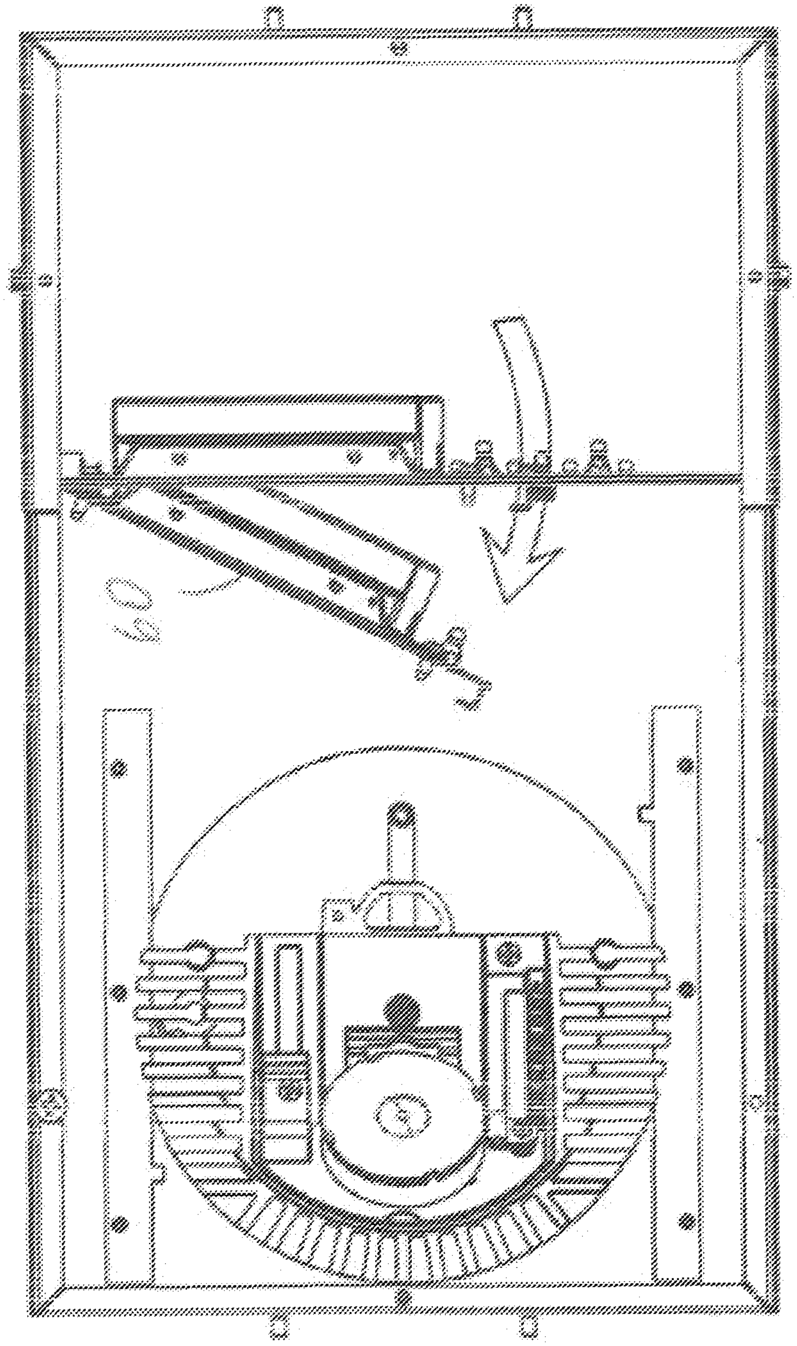
Figure 19:
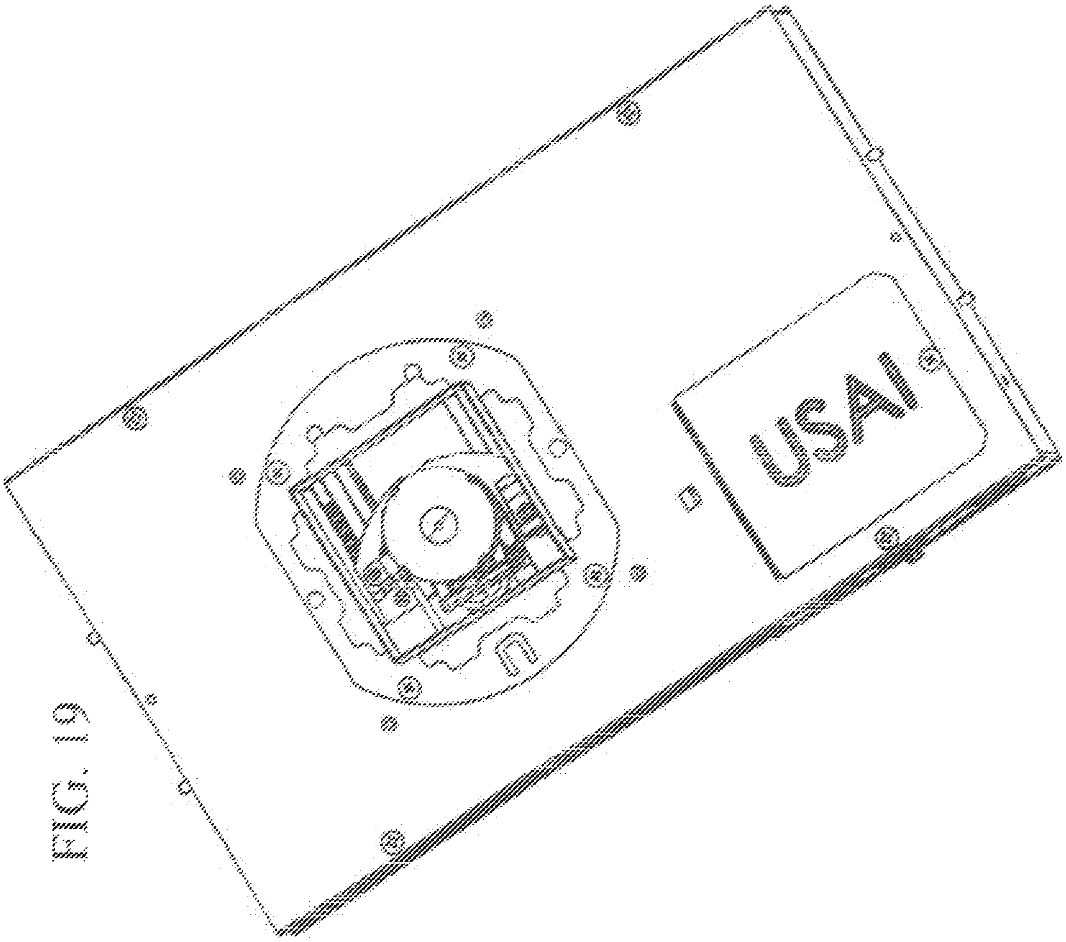
FIG. 19 is a perspective view, from the bottom, of the lighting fixture of FIG. 1, in the operation mode, in a third configuration.
Figure 20:
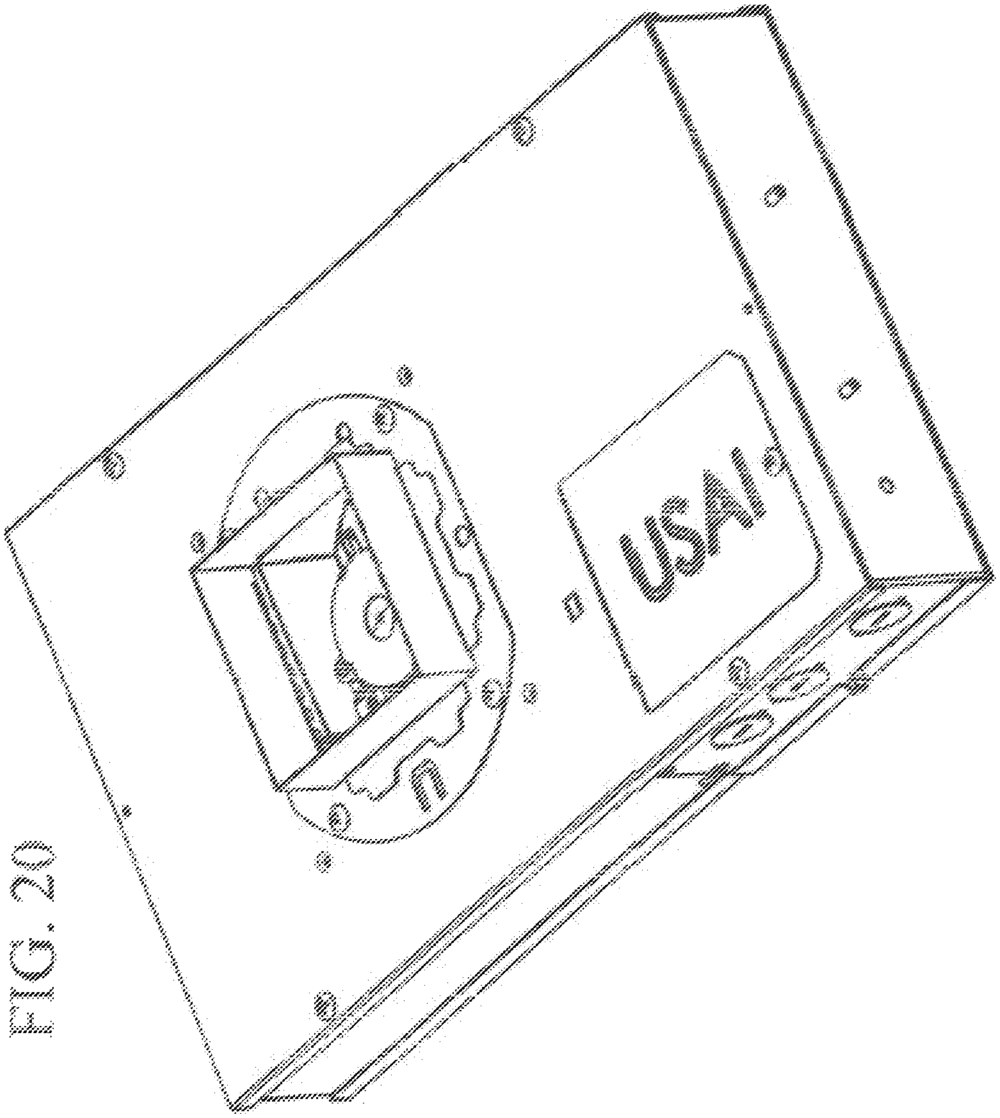
FIG. 20 is a perspective view, from the bottom, of the lighting fixture of FIG. 19.
Figure 21:
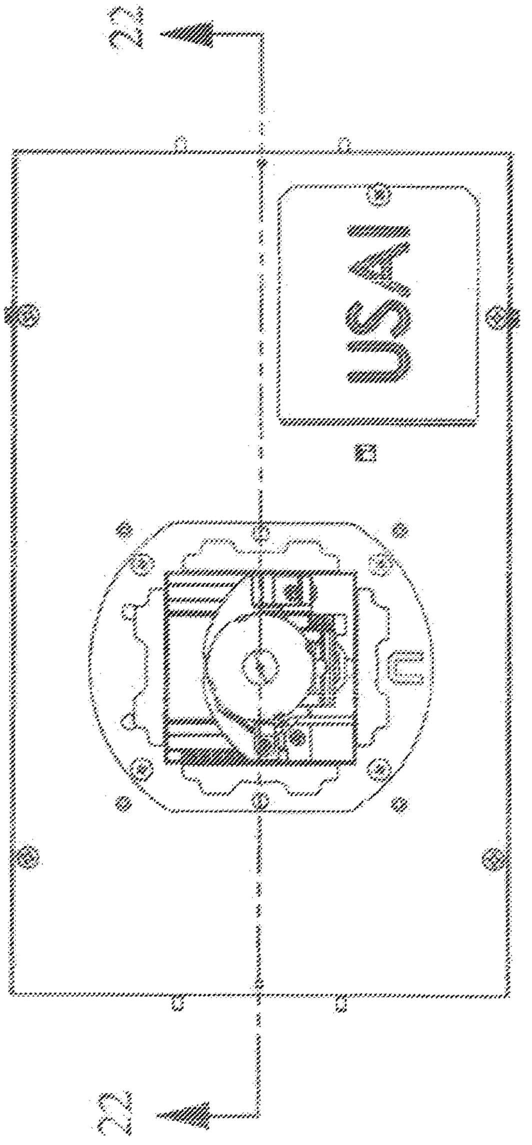
FIG. 21 is a bottom view of the lighting fixture of FIG. 19.
Figure 22:
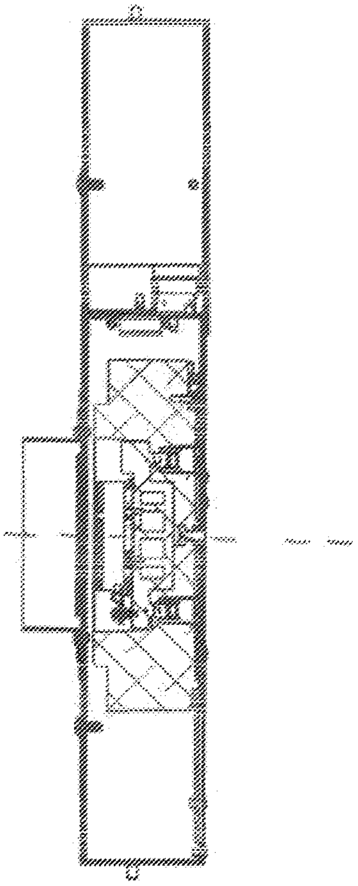
FIG. 22 is cross section view taken along line 22-22 of FIG. 21.
Figure 23:
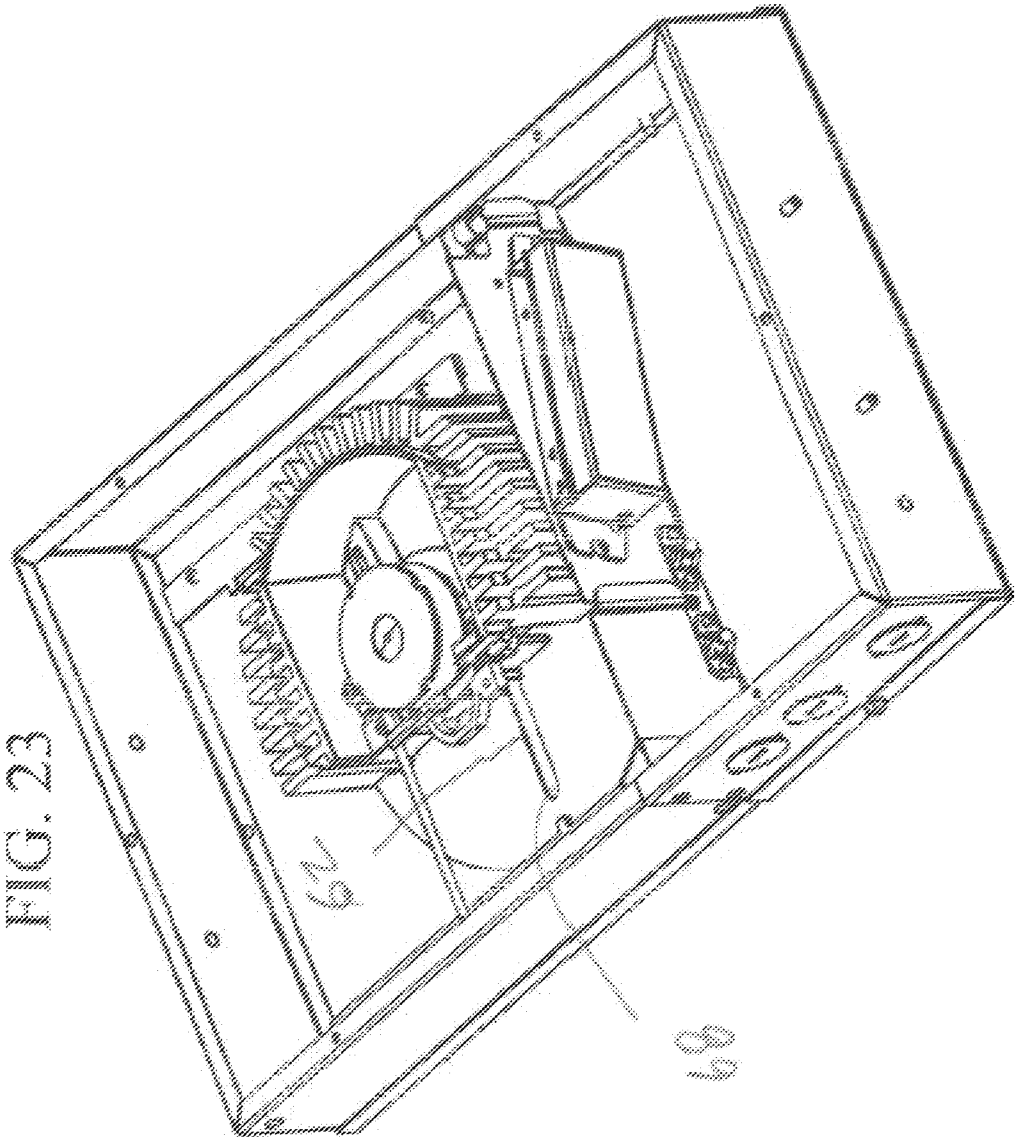
FIGS. 23 and 24 are perspective views, from the bottom, of the lighting fixture of FIG. 19, with the bottom wall removed.
Figure 24:
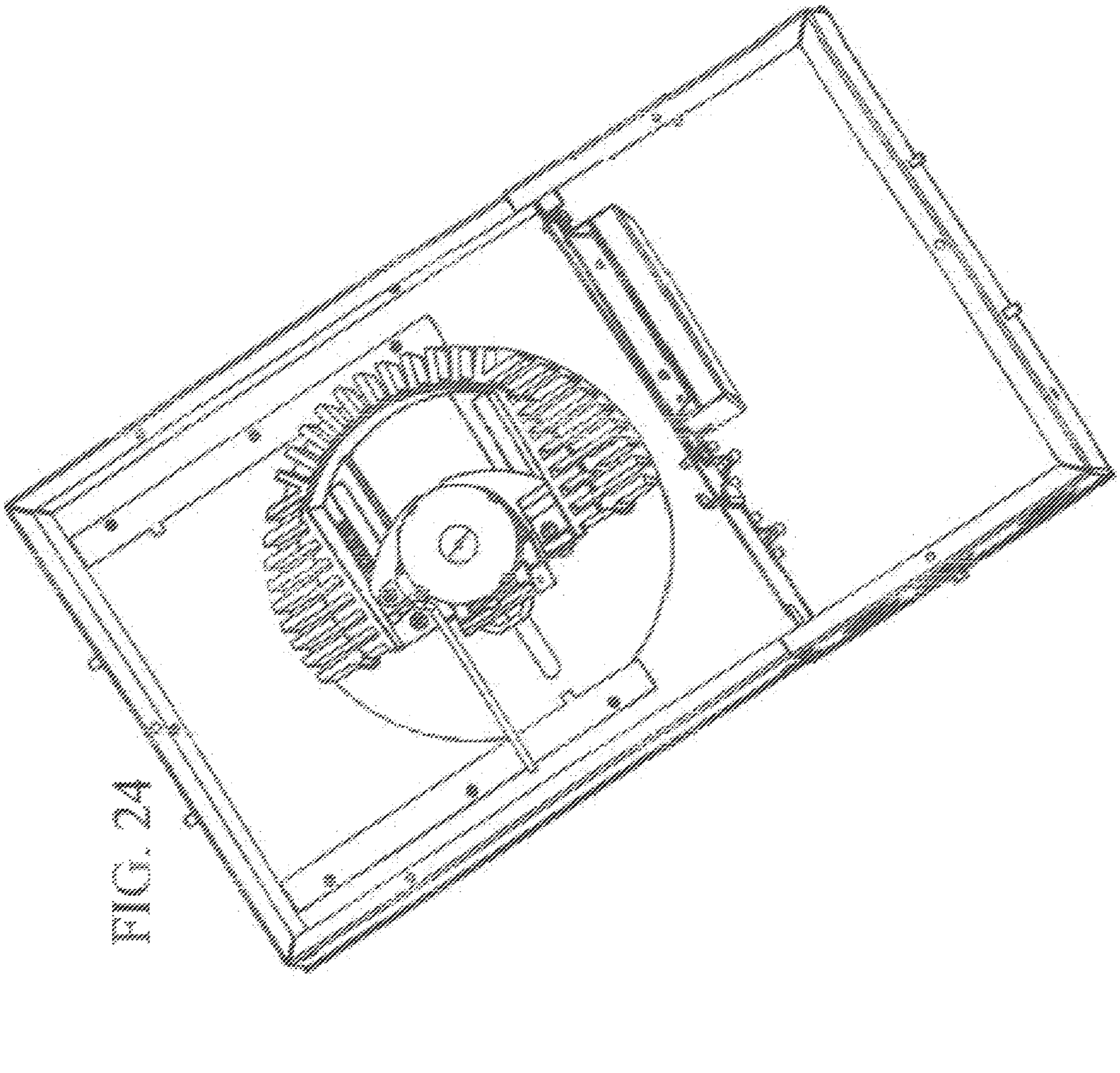
Figure 25:
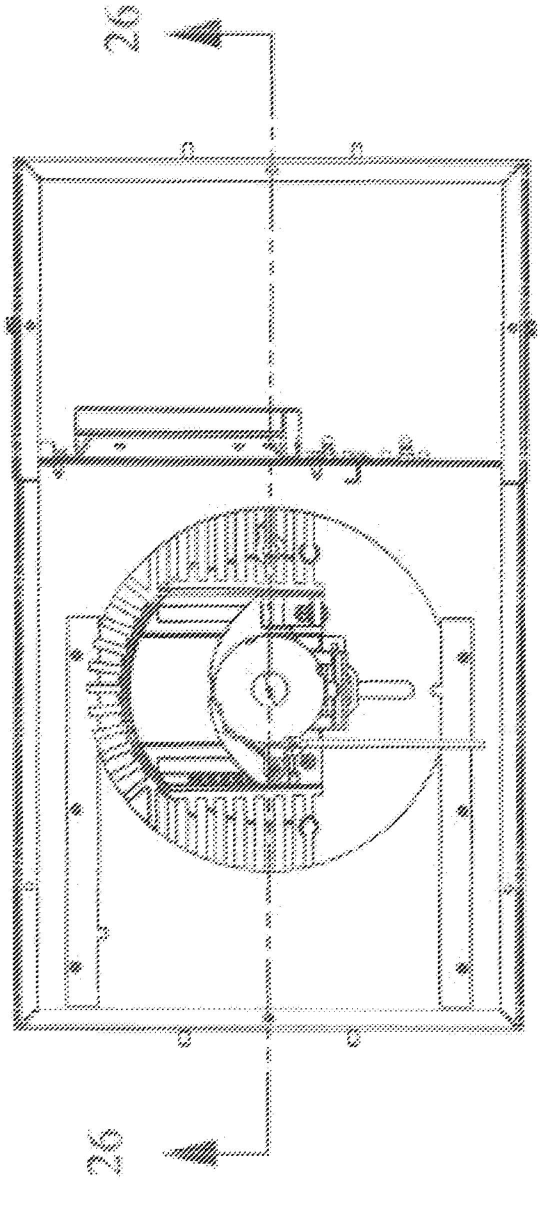
FIG. 25 is a bottom view of the lighting fixture of FIG. 19, with the bottom removed.
Figure 26:
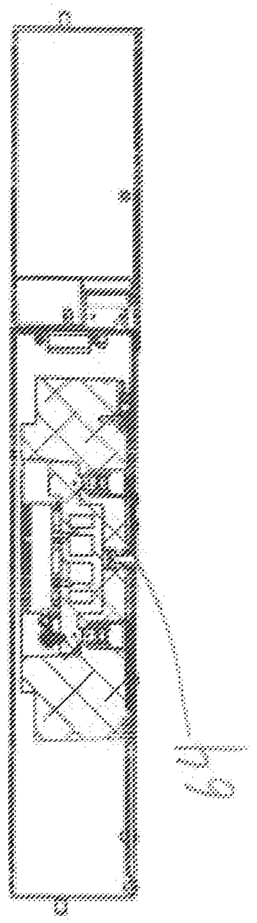
FIG. 26 is cross section view taken along line 26-26 of FIG. 25.
Figure 27C:
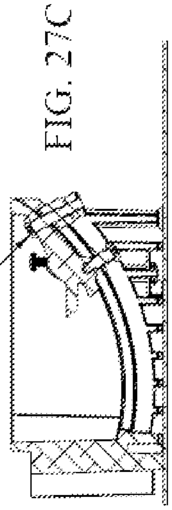
FIGS. 27A-30 are further views of the light fixture.
Figure 27B:
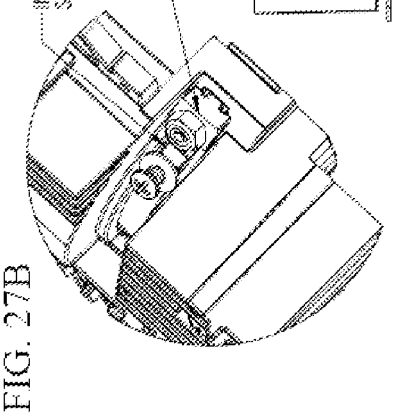
Figure 27F:
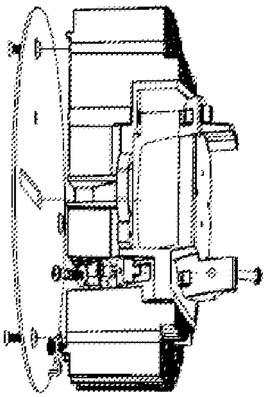
Figure 27E:
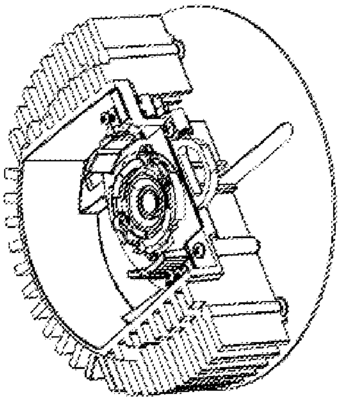
Figure 27A:
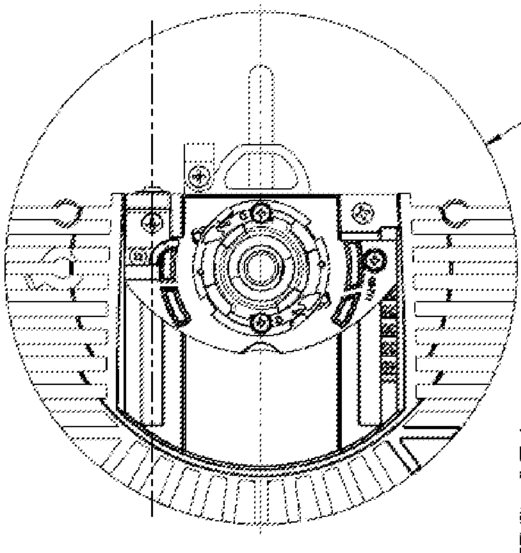
Figure 27D:
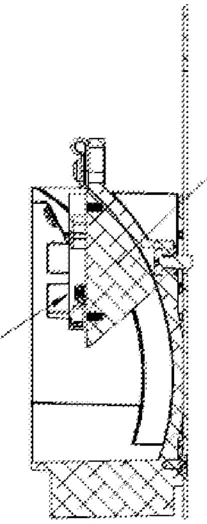
Figure 28A:
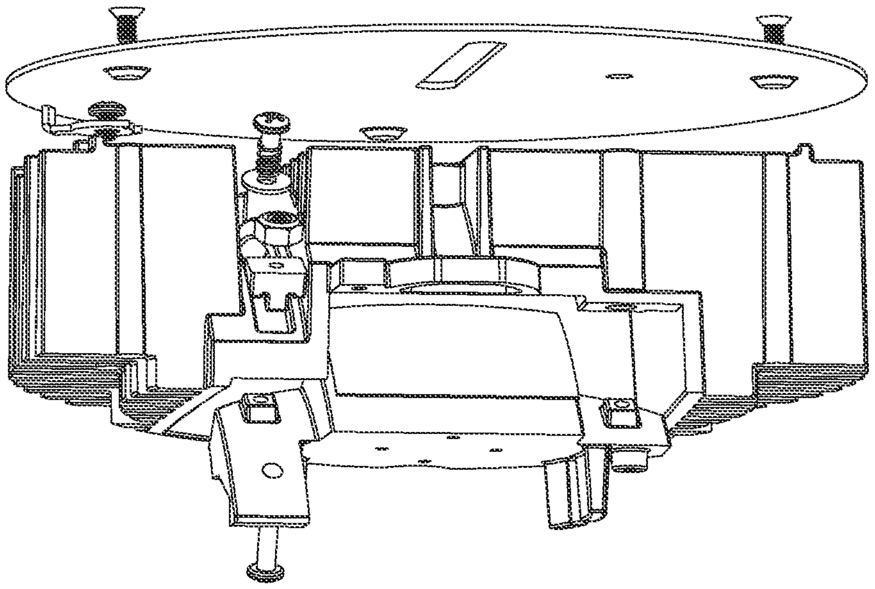
Figure 28B:
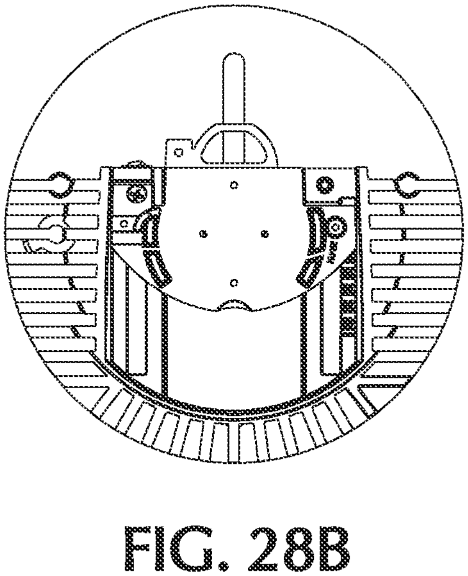
Figure 28C:
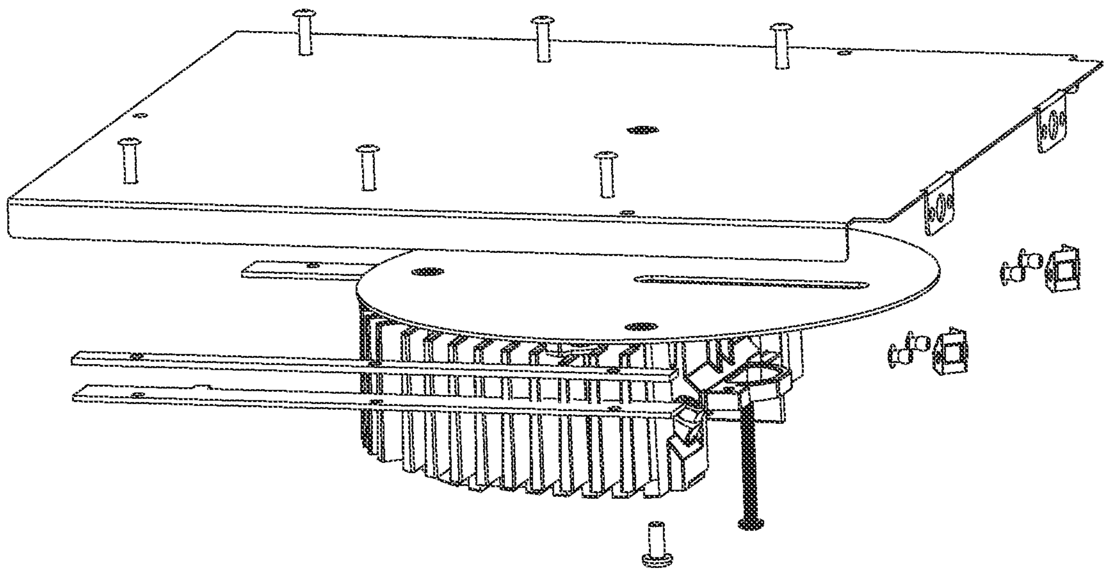
Figure 28D:
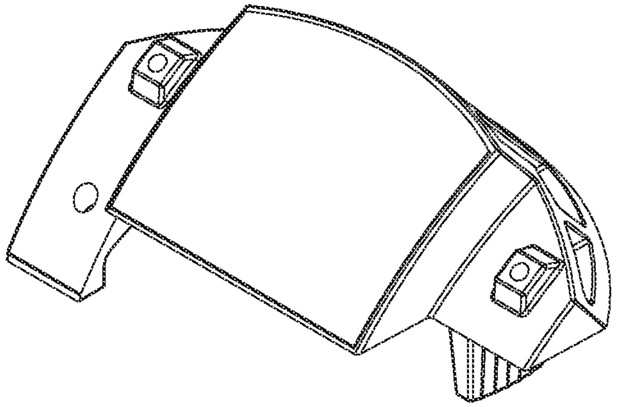
Figure 29:
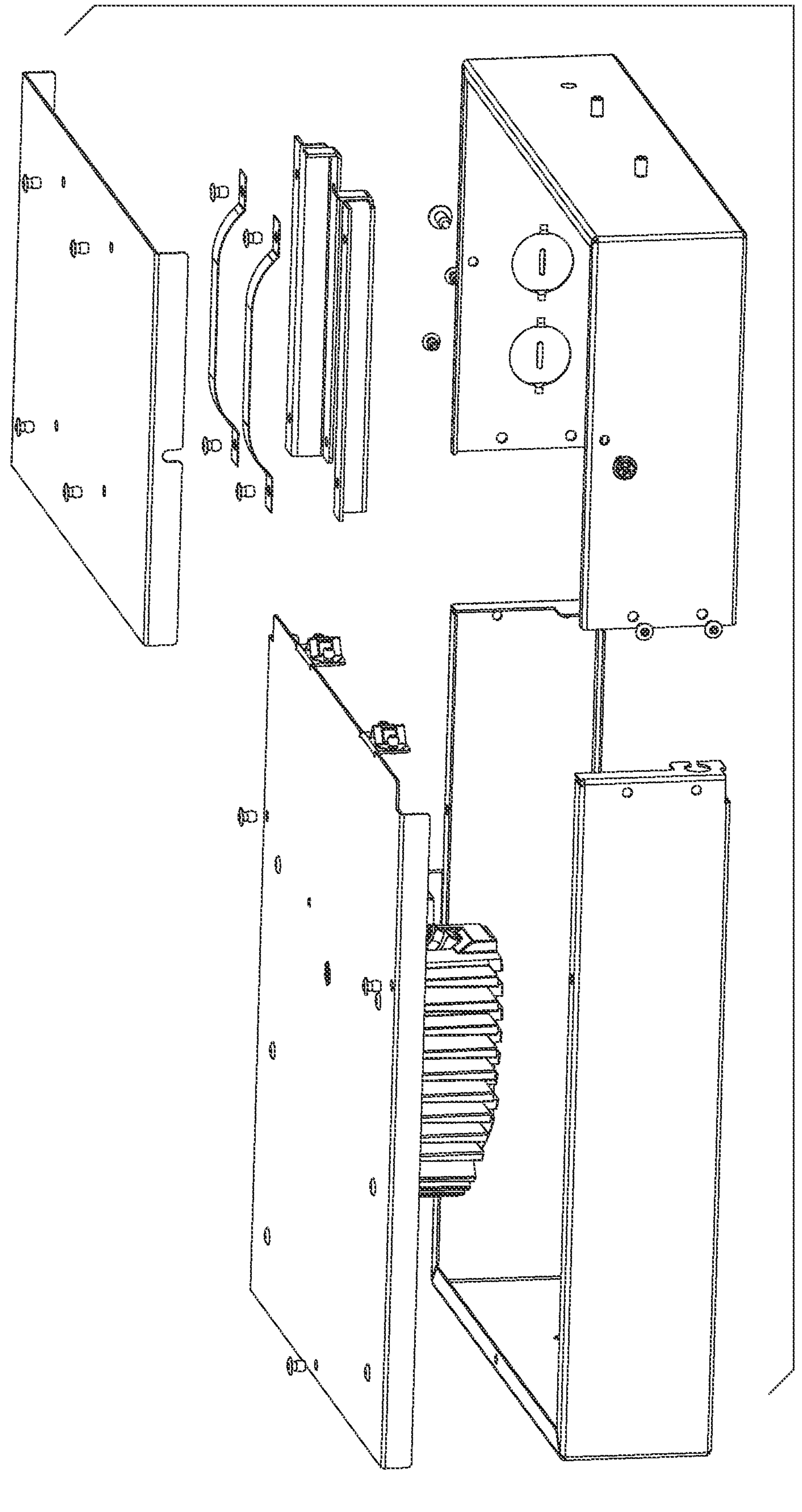
Figure 30:
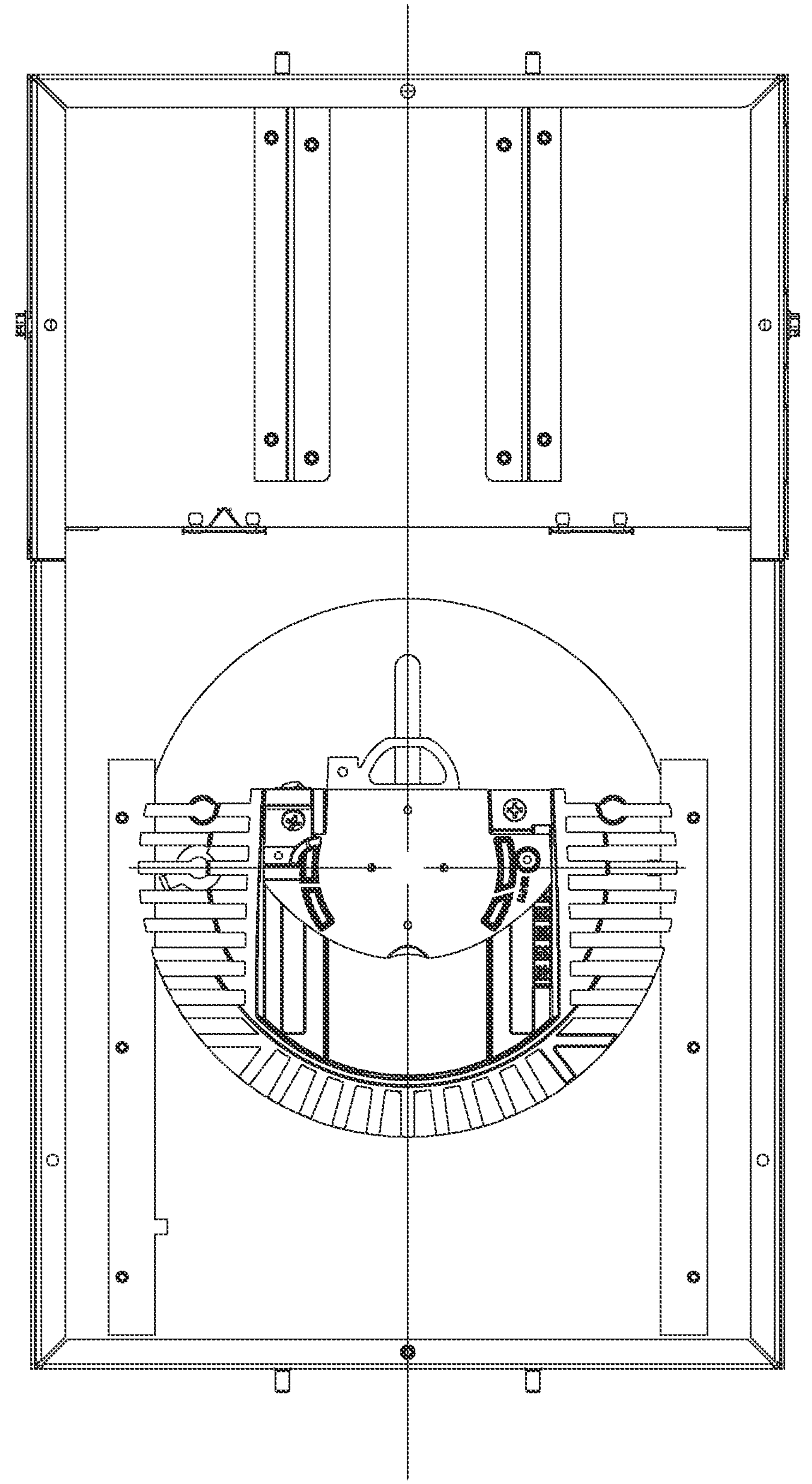

Referring to FIGS. 17-18 (which are views from below), the lighting fixture 10 has a service mode wherein the light engine assembly 50 is in a service position substantially laterally (typically horizontally) displaced from the operation position, for example in a direction away from a driver 52 of the lighting fixture, to provide clearance for installation and/or removal of the driver 52 or other components within the housing 12 from within the room, after the lighting fixture has been installed.

The driver 52 can be mounted within a driver enclosure 56 within the housing 12, which is separated from light source enclosure 58 of the housing by a removable door 60. Thus, to remove the driver 52, the light fixture can be moved into the service position, then the door 60 can be removed to access and remove or replace the driver 52 through the aperture 20, from within the room, after the lighting fixture 10 has been installed.

The driver 52 can be mounted to the housing 12, for example to the top wall 18, by pair of rails connected to the housing. Spring members, which are biased toward the housing extend between the rails and the housing to secure the driver 52 to the housing. This allows for secure, toolless mounting/removal of the driver 52 to/from the housing.

In the service position (e.g., FIGS. 17-18), the light engine assembly 50 is substantially displaced from the aperture 20 and the lighting element 22 can be inoperable to emit any substantial or effective light through the aperture 20.

To allow movement between the operation and service positions, the second heat sink 30 is preferably fixedly mounted to a generally circular (e.g., disk-shaped) support plate 36 which is movably mounted to the housing 12, and particularly the top wall 18 of the housing. The support plate 36 can be mounted to the top wall 18 by a pair of opposed, linear guides 38, 40 which are connected to the top wall 18 of the housing 12. A top surface of the support plate is adjacent and/or closely abuts the top wall 18 of the housing, and the opposed guides 38, 40 extend inwardly under the support plate 36 on opposite sides thereof and contact peripheral positions of a bottom surface 42 of the support plate 36, and thereby vertically support the support plate 36, light engine assembly 50 connected thereto, while allowing for rotation and translation relative to the housing 12.

The support plate 36 is operable to slide along the guides 38, 40 such that it can translate relative to the housing 12 parallel to the top wall 18 of the housing 12 and/or to the plane of the aperture 20. In this manner, the light engine assembly 50 can be selectively manually moved by a user (by reaching through the aperture 20 from within the room below) between and into operation and service positions corresponding to the operation and service modes of the light fixture.

Referring to FIGS. 19-26 (which are views from below and a side), the lighting fixture 10 is shown in the operation mode, at a zero degree tilt and 90 degree rotation. To allow for rotational aiming of the optical axis 54 of the light source 22, the support plate 36 is preferably operable to rotate relative to the housing 12 about a rotation axis 44 which is typically vertical and is preferably substantially perpendicular to a plane of the aperture 20, which is typically a horizontal plane. The rotation axis 44 can be aligned with (co-linear) with the center axis 46 of the aperture 20.

The lighting fixture 10 can include an over-rotation stop to prevent rotation greater than a predetermined amount, for example more than 365 degrees. Further, the lighting fixture 10 preferably includes a rotation lock to selectively permit and prevent rotation of the second heat sink, which lock is accessible through the aperture.

Preferably, the support plate 36 can include an elongated, linear guide slot 62 therein which serves to limit rotational and/or translational movement of the support plate 36 in certain situations. The guide slot 62 can have two closed ends, where a first closed end 66 is substantially at a center of the support plate and is substantially aligned with the rotation axis 44, and where a second closed end 68 is disposed substantially radially outwardly from the center of the support plate 36, for example by about 2-5 inches.

A projection 64 extends downwardly from the top wall 18 of the housing and extends into the guide slot 62. The projection 64 allows translational movement the support plate 36 only when the light engine assembly 50 is in the zero degree rotation position (e.g., FIGS. 1-8 and 17-18), where the guide slot 62 is parallel to the linear guides 38,40. Further, the projection 64 allows rotational movement of the support plate 36 only when the lighting fixture 10 is in the operation mode (e.g., FIGS. 1-16 and 19-26), where the projection is at the first end of the guide slot 62 located at a center of the support plate.

The projection 64 can be threaded and can receive a locking screw 72 therein to fix a rotational and/or translational position of the support plate 36 relative to the housing 12. The locking screw is preferably directed through the second heat sink 30 and the guide slot 62 of the support plate 36.

What is claimed:

1. A low-profile recessed light fixture adapted to be installed in a horizontal ceiling and configured to emit light through an opening in the ceiling into a room therebelow, the recessed light fixture comprising:

a housing having a horizontal longitudinal axis (X-axis) and a horizontal lateral axis (Y-axis) perpendicular to the longitudinal axis (X-axis), and having a vertical axis (Z-axis), and the housing having a low-profile height dimension parallel to the vertical axis (Z-axis);

the housing forming a light engine enclosure having an aperture and forming a driver enclosure spaced from the aperture parallel to the longitudinal axis (X-axis);

a lighting driver configured to be disposed within the driver enclosure;

a light engine assembly disposed within the light engine enclosure, the light engine assembly having a heat sink assembly and a light emitting element, and the light emitting element having an optical axis;

the heat sink assembly including first and second heat sinks, the light emitting element being mounted to the first heat sink and the first heat sink being movably mounted to the second heat sink;

the first heat sink being operable to tilt relative to the second heat sink about a tilt axis parallel to the lateral axis (Y-axis) through a tilt range from a zero tilt position wherein the optical axis of the light emitting element is substantially parallel to the vertical axis (Z-axis), to a wall wash tilt position wherein the optical axis is aligned at a substantial angle relative the vertical axis (Z-axis);

the light engine assembly being operable to move horizontally parallel to the longitudinal axis (X-axis) relative to the housing between an operation position wherein the light engine assembly is at a first distance from the driver enclosure, and a service position wherein the light engine assembly is at a second distance from the driver enclosure greater than the first distance;

when the light engine assembly is in the operation position and the first heat sink is in the zero tilt position, the optical axis of the light emitting element being substantially parallel to the vertical axis (Z-axis) and substantially passing through a center of the aperture, and when the light engine assembly is in the service position and the first heat sink is in the zero tilt position, the optical axis of the light emitting element being substantially parallel to the vertical axis (Z-axis) and being substantially offset from the center of the aperture;

the light engine assembly being operable to rotate relative to the housing about a rotation axis parallel to the vertical axis (Z-axis) when in the operation position through a rotation range of at least 360 degrees including a zero rotation position;

in the operation position, the light engine assembly being operable to emit light through the aperture throughout the rotation range and tilt range; and the lighting driver being insertable into and removable from the driver enclosure, through the aperture, when the light engine assembly is in the service position.

2. A low-profile recessed light fixture, as in claim 1 wherein:

the light engine assembly is movable between the operation position and the service position when the light engine assembly in in any tilt position in the tilt range.

3. A low-profile recessed light fixture, as in claim 1 wherein:

the light engine assembly is fixedly mounted to a rotation disc which is mounted to a top wall of the housing by a pair of guides which are operable to substantially constrain the movement of the light engine assembly relative to the housing to translation movement between the operation and service positions, and rotation about the rotation axis.

4. A low-profile recessed light fixture, as in claim 1 wherein:

the rotation disc includes a linear guide slot having a first end at a center of the rotation disc and a second end disposed radially outwardly from the center, and the rotation axis of the light engine assembly passing through the center of the rotation disc;

the top wall of the housing including a projection which projects into the guide slot of the rotation disc, and the guide slot and projection are operable to permit rotation of the light engine assembly relative to the housing when in the operation position and to prevent rotation of the light engine assembly relative to the housing when in the service position; and the guide slot and projection are operable to permit movement of the light engine assembly from the operation position to the service position when in the zero rotation position and to prevent movement of the light engine assembly from the operation position to the service position when in a rotation position substantially different than the zero rotation position.

5. A low-profile recessed light fixture, as in claim 1 wherein:

the first heat sink maintains a substantially constant thermal connection pressure with the second heat sink in all tilt positions and during movement between tilt positions.

6. A low-profile recessed light fixture, as in claim 5 wherein:

the light engine assembly includes a tilt lock operable to fix a tilt position of the first heat sink, and the tilt lock not affecting the thermal connection pressure between the first and second heat sinks and not affecting the tilt position.

7. A low-profile recessed light fixture, as in claim 1 wherein:

the height dimension of the housing is no greater than about 3.5 inches.

8. A low-profile recessed light fixture adapted to be installed in a horizontal ceiling and configured to emit light through an opening in the ceiling into a room therebelow, the recessed light fixture comprising:

a housing having a horizontal longitudinal axis (X-axis) and a horizontal lateral axis (Y-axis) perpendicular to the longitudinal axis (X-axis), and having a vertical axis (Z-axis), and the housing having a low-profile height dimension parallel to the vertical axis (Z-axis);

the housing forming a light engine enclosure having an aperture;

a lighting driver configured to be disposed within a driver enclosure;

a light engine assembly disposed within the light engine enclosure, the light engine assembly having a heat sink assembly and a light emitting element, and the light emitting element having an optical axis;

the heat sink assembly including first and second heat sinks, the light emitting element being mounted to the first heat sink and the first heat sink being movably mounted to the second heat sink;

the first heat sink being operable to tilt relative to the second heat sink about a tilt axis parallel to the lateral axis (Y-axis) through a tilt range from a zero tilt position wherein the optical axis of the light emitting element is substantially parallel to the vertical axis (Z-axis), to a wall wash tilt position wherein the optical axis is aligned at a substantial angle relative the vertical axis (Z-axis);

when the light engine assembly is in the zero tilt position, the optical axis of the light emitting element being substantially parallel to the vertical axis (Z-axis) and substantially passing through a center of the aperture;

the light engine assembly being operable to emit light through the aperture throughout the rotation range and tilt range; and the first heat sink maintains a substantially constant thermal connection pressure with the second heat sink in all tilt positions and during movement between tilt positions.

9. A low-profile recessed light fixture, as in claim 8 wherein:

the light engine assembly includes a tilt lock operable to fix a tilt position of the first heat sink, and the tilt lock not affecting the thermal connection pressure between the first and second heat sinks and not affecting the tilt position.

* * * * *